United States Patent Office 3,133,124
Patented May 12, 1964

3,133,124
MULTI-STAGE NITRATION OF CYCLOHEXANE
John H. Bonfield, Hamburg, N.Y., assignor to Allied
Chemical Corporation, New York, N.Y., a corporation
of New York
No Drawing. Filed Feb. 16, 1961, Ser. No. 89,652
10 Claims. (Cl. 260—644)

This invention relates to the production of mononitrated cyclohexane and more particularly to a vapor phase method for producing mononitrated cyclohexane, an important intermediate in the production of ε-caprolactam used to produce polycaproamide synthetic fibers and molding resins.

In my co-pending patent application Serial No. 89,613, filed February 16, 1961, is disclosed a process of mononitrating cyclohexane in the vapor phase involving mixing cyclohexane vapors and a gaseous nitrating agent, comprising nitric acid or nitrogen dioxide ($NO_2$ or $N_2O_4$ or a mixture of both), at a temperature below that at which substantial nitration occurs, i.e., below 250° C., in the molar ratio of from 4 up to 10 mols of cyclohexane per mol of nitric acid (as 100% $HNO_3$) or from 1 up to 5 mols of cyclohexane per mol of nitrogen dioxide (calculated as $NO_2$), and passing this gaseous mixture through a reaction zone maintained at a temperature between about 250° C. and 375° C., for a residence time of at least 20 seconds, preferably from 20 to 150 seconds. Preferably, the temperature and residence times within their specified ranges bear an inverse relation to each other, i.e., when the temperature is in the upper portion of the range of from 250° to 375° C. shorter residence times are used within the range of from 20 to 150 seconds, and when the temperature is in the lower portion of the 250° to 375° C. range longer residence times within the range of from 20 to 150 seconds are employed. The reaction mixture is removed from the reaction zone and the mononitrated cyclohexane is separated therefrom. The unreacted cyclohexane is recovered from the reaction gases and can be recycled to the nitration reaction zone and eventually substantially entirely converted to mononitrocyclohexane.

This invention is an improvement on the invention of my aforesaid co-pending patent application. According to this improvement, the vapor phase mononitration of cyclohexane is carried out in two or more stages, in the first of which a vapor mixture of cyclohexane vapors and vapors of the nitrating agent preheated to a temperature below that at which substantial nitration occurs, i.e., below 250° C., in the molar ratio of from 4 up to 10 mols, preferably from 4 to 5 mols, of cyclohexane per mol of nitric acid, or from 1 up to 5 mols, preferably from 1 to 1.5 mols, of cyclohexane per mol of nitrogen dioxide, is passed through a reaction zone maintained at a temperature between about 250° C. and 375° C., for a residence time of from 20 to 150 seconds, preferably from 20 to 70 seconds, and in the subsequent stage or stages of which, the reaction mixture from a preceding stage is mixed with additional nitrating agent, preferably added in amounts of from 0.8 to 1.2 mols per mol of nitrating agent employed in the first stage, and the resultant mixture is passed through an additional reaction zone maintained at a temperature of from 250° to 375° C., for a residence time of from 20 to 150 seconds. The reaction may thus be carried out in two, three, four, or even more stages with the addition of a specified amount of nitrating agent to the reaction mixture from each preceding stage prior to passing the reaction mixture through a succeeding reaction zone. It is preferred to employ a four-stage procedure.

I have found that mixing the gaseous reaction products from the first stage carried out as above described, with additional nitrating agent in the vapor phase, does not result in the formation of an explosive mixture even though the overall ratio of cyclohexane to nitrating agent is below that which was heretofore considered the safe limit for the ratio of cyclohexane to nitrating agent. Ratios of cyclohexane to nitrogen dioxide of less than 1 mol of cyclohexane to 1 mol of nitrogen dioxide involve explosion hazards. In the process of the present invention the mixture passed through the first stage contains at least 1 mol and preferably about 1.5 mols of cyclohexane per mol of nitrogen dioxide. Employing nitric acid as the nitrating agent, the minimum safe molar ratio of cyclohexane to nitric acid is 4 to 1; below this ratio there is a danger of forming an explosive mixture. In the first stage of the process, using nitric acid as the nitrating agent, the molar ratio is at least 4 and preferably about 5 mols of cyclohexane to 1 mol of nitric acid. In the practice of the present invention, while the molar ratio of cyclohexane to nitrating agent introduced into the first reaction zone is within the above limits, additional nitrating agent (preferably about 0.8 to 1.2 mols per stage) is added in each of the succeeding stages. Thus, employing a four-stage procedure, the overall molar ratio is about 1.5 mols of cyclohexane to 4 mols of nitrogen dioxide which, it will be noted, is far below the molar ratio heretofore considered safe. Surprisingly, however, I have found that when the further quantities of nitrating agent are mixed with the reaction products emanating from the first and succeeding stages, all operated under the conditions hereinabove set forth, the reaction proceeds smoothly and safely.

Each of the reaction zones is maintained at a temperature of from 250° to 375° C. The preferred reaction temperature, employing nitric acid as the nitrating agent, is between 290° and 350° C. in each stage. Using nitrogen dioxide, the preferred temperature is between 265° and 325° C. Preferably, the stages are maintained at temperatures which progressively increase about 5° to 10° C. from one stage to the next, the last stage being maintained at a maximum temperature of about 375° C., preferably 350° C. when employing nitric acid or 325° C. when using nitrogen dioxide. Alternatively, the successive stage reactors can be of increasing dimensions to compensate for the reduction in residence time that would result, in equi-dimensional reactors, from the inert gas dilution by the reaction products from preceding stages.

Atmospheric pressure conditions are maintained in each stage.

As in the case of the process of my co-pending application, nitric oxide may be added to the reaction mixture introduced into each of the stages. The addition of nitric oxide increases the yield of the mononitrated cyclohexane as disclosed more fully in my co-pending application. The amount of nitric oxide admixed with the reactants preferably is from 0.5 to 1 mol of nitric oxide per mol of nitrating agent introduced into each stage. In each stage, however, nitric oxide is generated by the side reaction:

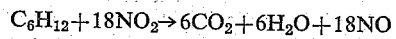

$$C_6H_{12} + 18NO_2 \rightarrow 6CO_2 + 6H_2O + 18NO$$

in the amount of about 0.6 mol per mol of nitrogen dioxide thus reacting. Hence nitric oxide need be added only to the initial reaction stage or stages, the optimum concentration of from 0.5 to 1.0 mol of nitric oxide per mol of nitrating agent introduced into each stage being formed, at least in part, by the above side reaction.

The nitration reaction is carried out continuously in each stage. Thus the nitration may be carried out by flowing the reactants through a first reactor, so dimensioned as to give the desired residence time and maintained at the specified temperature, the reaction products being continuously withdrawn from the exit end of the reactor, admixed with additional nitrating agent, and the resultant mixture being passed through a second reactor constituting the second reaction stage, also dimensioned to give the desired residence time and maintained at the specified temperature, from which the reaction products are continuously withdrawn. If additional stages are used, the reaction products from a preceding stage are admixed with additional nitrating agent before passage through a succeeding stage, the latter being dimensioned to give the specified residence time and maintained at the specified temperature.

The reaction mixture from the final stage is removed and the mononitrated cyclohexane separated therefrom. The unreacted cyclohexane is recovered from the reaction gases from the final stage and can thereafter be recycled to one or more of the preceding stages for further conversion.

The equipment used for the practice of the process should, of course, be resistant to corrosion by nitric acid. Glass, glass-lined or acid-resistant stainless steels can be used.

The following examples, in which temperatures are given in °C. and parts and percentages are on a weight basis, illustrate preferred modes for practicing the invention. It will be understood the invention is not limited to these examples.

EXAMPLE 1

A mixture of cyclohexane vapors and nitrogen dioxide in the molar ratio of 2.04 to 1 was introduced at 185° into a 2000-part volume spherical glass reactor heated to 300°. The residence time in this reactor was 30 seconds. The gaseous products were passed from the reactor through a preheating and mixing tube wherein additional nitrogen dioxide in amount equal to that introduced into the spherical reactor was added to the gas stream. This mixture was passed through a second reactor maintained at 305°, identical with the first; the residence time in the second reactor was 20 seconds. The gas stream was again admixed with an equal quantity of nitrogen dioxide and passed through a third reactor maintained at 310°; the residence time in the third reactor was 20 seconds. The gas stream was again mixed with a fourth equal quantity of nitrogen dioxide and the mixture directed through a fourth reactor maintained at 310°; the residence time in the fourth reactor was 20 seconds.

In this fashion 282.3 parts/hour of cyclohexane were reacted with 75.5 parts/hour/stage of nitrogen dioxide. The total residence time for four stages was about 90 seconds. In three hours a total of 807 parts of cyclohexane was reacted with 907 parts of nitrogen dioxide, with one-fourth of this quantity being added at each stage. The overall molar ratio was thus about 0.49 mol of cyclohexane to 1 mol of nitrogen dioxide.

The gaseous reaction products were passed through a water cooled condenser. The condensed product separated into two layers, the upper oil layer of which yielded on distillation, 504 parts of cyclohexane (63% conversion) and 409 parts of crude nitrocyclohexane containing 78.8% pure nitrocyclohexane. The yield with respect to cyclohexane consumed was thus 69.3%.

When nitric oxide (22.5 parts/hour/stage) was fed along with the nitrogen dioxide in the procedure described above, the yield with respect to cyclohexane consumed was increased to 79%.

EXAMPLE II

Cyclohexane vapors and nitrogen dioxide in a molar ratio of 1.58 to 1 were mixed at about 185° and the mixture was fed into a spherical glass reactor heated to maintain the vapors therein at 280°. The reacted vapors were mixed with an additional amount of nitrogen dioxide equal to that passed into the spherical reactor and the resultant mixture passed into a second reactor of similar size and shape which was heated to maintain the vapors at 285°. The residence time in the first stage was maintained at 42.5 seconds and in the second stage at about 30 seconds.

The gas stream from the second reactor was passed through a condenser and the non-condensed portion was passed into a dilute solution of hydrogen peroxide. The off-gas was absorbed in aqueous caustic soda.

The reaction period was three hours, during which a total of 798 parts of cyclohexane were admitted to the reaction. 274 parts of nitrogen dioxide were added to each stage.

The crude product condensed from the gas stream contained 507.7 parts of cyclohexane which was recovered by distillation. The crude nitrocyclohexane oil weighed 402 parts and contained 321.5 parts of pure nitrocyclohexane. The non-condensable portion of the reaction gases contained 272 parts of nitrogen oxides, recovered as nitric acid, and 46.4 parts of carbon dioxide.

The yield from this two-stage reaction was then 72.8% based on cyclohexane consumed and 78.5% based on nitrogen dioxide consumed.

EXAMPLE III

Following the procedure of Example 2, cyclohexane was nitrated with nitrogen dioxide in a four-stage procedure. The preheated mixture (190°) of cyclohexane and nitrogen dioxide was admitted to the first reactor operated at 275°, the gases emanating from this reactor were admixed with nitrogen dioxide and fed to the second stage maintained at 280°, and thence to the third stage (285°) and to the fourth stage (290°). The residence times in each of the stages were maintained at 42.5, 32.5, 26.3, and 22.0 seconds, respectively.

During the three-hour period, 798 parts of cyclohexane were admitted to the first stage and reacted with a total of 1094 parts of nitrogen dioxide. The latter was introduced in four equal portions (273.5 parts each), each being mixed with the feed stock to each of the reactors, which operated in series.

The condensed crude product contained 290.8 parts of unchanged cyclohexane and 624 parts of crude nitrocyclohexane oil, which latter contained 536.5 parts of pure nitrocyclohexane.

The uncondensed portion of the reaction gases contained 543 parts of nitrogen oxides recovered as nitric acid.

In this example a 63.5% conversion of cyclohexane resulted. The yield of nitrocyclohexane obtained in this four-stage process was 68.8%, based on the cyclohexane consumed, and was 73.3%, based on the nitrogen dioxide used.

Using an initial molar ratio of cyclohexane to $NO_2$ of 1.58 to 1, adding 1 mol of $NO_2$ to the reaction mixture from each stage passed through a succeeding stage and using the temperature and residence time of Example III gave the results recorded in Table 1 based on an analysis of samples of the reaction products leaving each stage.

Table 1

|  | Stage 1 | Stage 2 | Stage 3 | Stage 4 |
| --- | --- | --- | --- | --- |
| Percent yield mononitrated cyclohexane based on cyclohexane consumed | 66.5 | 66.8 | 64.2 | 61.6 |
| Percent mononitrocyclohexane in crude product | 18.8 | 34.3 | 51.0 | 67.6 |
| Percent nitrocyclohexane in crude oil layer separated from aqueous phase | 81.0 | 83.0 | 85.9 | 89.5 |
| Percent total cyclohexane reacted based on amount introduced in first stage | 22.3 | 36.5 | 61.0 | 83.6 |

It will be noted that although the yield based on the amount of cyclohexane reacted or consumed is fairly constant, the amount of cyclohexane reacted increases from stage to stage; also the amount of nitrocyclohexane in the crude increases with consequent improvement in the quality of the crude.

EXAMPLE IV

Cyclohexane (269 parts/hour=3.2 mol/hour) and 68% nitric acid (67.5 parts/hour=45.9 parts 100% nitric acid or 0.73 mol/hour) were mixed in the vapor state at about 175° and the mixture was passed into a spherical reactor and maintained at 315 for 40 seconds therein.

The reaction mass was mixed with a like amount of 68% nitric acid vapor and passed into a similar reactor wherein the mixture was maintained at 315° for 40 seconds.

The gas stream from the second reactor was admixed with a like quantity of nitric acid vapor and then passed into a third reactor maintained at 315° for 40 seconds.

The resulting stream was then admixed with a similar quantity of nitric acid vapors and fed into a fourth reactor maintained at 315°, and held for 40 seconds therein. The gases emanating from the final reactor were cooled to remove therefrom a condensable reaction product which separated into layers.

A total of 399 parts of cyclohexane were thus reacted with 290.5 parts of 68% nitric acid. From the upper layer of the condensed product, 260 parts of cyclohexane were recovered and 93.3 parts of nitrocyclohexane were found in the crude residual oil. These data indicate a conversion of 34.8% of the cyclohexane, and a yield of 43.8% based on the cyclohexane consumed.

Not only does this invention result in increased conversion rates of the cyclohexane and increased yields of nitrocyclohexane, but also the danger of explosions is substantially eliminated. The large excesses of hydrocarbon formerly used which even with high conversion rates required the relatively expensive and time-consuming recovery and recycling of major proportions of hydrocarbon, can be virtually eliminated by the multi-stage technique of this invention. Thus a relatively large proportion of cyclohexane can be reacted initially with a small proportion of nitrating agent in a safe manner to provide a non-hazardous reactive mixture. An excess of cyclohexane is fed to the initial stage and this excess is gradually consumed by the additional nitrating agent admixed with the gaseous reaction products carried along into the several successive stages. By carrying out the nitration in the manner of this invention, it is possible to employ larger proportions of nitrating agent and thereby to achieve safer and more efficient nitration reactions than were heretofore possible. The recycling of cyclohexane can be virtually eliminated with resultant savings in production costs.

While the invention has been described in connection with the mononitration of cyclohexane, it is not limited thereto and includes the mononitration of alkanes generally, particularly alkanes having from 2 to 7 carbon atoms, in which in the first stage from 4 up to 10 mols, preferably from 4 to 5 mols, of alkane per mol of nitric acid or from 1 up to 5 mols, preferably from 1 to 1.5 mols, of alkane per mol of nitrogen dioxide are passed through a reaction zone at a temperature of from 250° to 375° C., for a residence time of from 20 to 150 seconds, and in the succeeding stage or stages of which additional nitrating agent, preferably about 1 mol in each stage, is added to the reaction mixture from a preceding stage and the resultant mixture passed through one or more additional reaction stages, each maintained at a temperature of from 250° to 375° C., for a residence time of from 20 to 150 seconds as hereinabove more fully disclosed in connection with the mononitration of cyclohexane.

Since certain changes may be made in carrying out this process without departing from the scope of the invention, it is intended that all matter contained in the above description shall be interpreted as illustrative and not in a limiting sense. Thus, for example, the reaction mixture produced from the first or any subsequent stage, except the last, need not in its entirety be admixed with additional nitrating agent and the resultant mixture passed through a succeeding nitrating stage. If desired, such reaction mixtures can be treated, e.g., partially condensed, to remove a portion of the nitrocyclohexane, with or without some of the cyclohexane, and additional nitrating agent added to the residue. Although such removal of nitrocyclohexane from and addition of nitrating agent to the reaction mixture may result in the latter having an explosive ratio of cyclohexane and nitrating agent, it is a feature of this invention that the presence in the reaction mixture (after the initial stage) of large volumes of by-products, notably nitrous oxide ($N_2O$), carbon dioxide, water vapor and the like, renders the mixture safe. Accordingly, the residue can be mixed with additional nitrating agent and the resultant mixture passed through a succeeding stage, with the ratio of cyclohexane to nitrating agent employed in the complete process materially below the ratios heretofore considered safe, and this without creating explosion hazards.

What is claimed is:

1. A multi-stage vapor phase process of mononitrating an alkane having from 2 to 7 carbon atoms, comprising:
   (a) mixing vapors of the alkane and vapors of a nitrating agent selected from the group consisting of nitric acid and nitrogen dioxide in the absence of liquid phase reactants, in the proportions of at least 4 mols of the alkane per mol of nitric acid when using nitric acid as the nitrating agent, and at least 1 mol of the alkane per mol of nitrogen dioxide, calculated as $NO_2$, when using nitrogen dioxide as the nitrating agent at a temperature below that at which substantial nitration occurs;
   (b) passing the resultant vapor mixture into the first of a plurality of reaction zones, in each of which the temperature is maintained within the range of from 250° to 375° C. and the residence time for the reactants and reaction products is at least 20 seconds; and
   (c) admixing the reaction products from each zone with additional vapors of the nitrating agent prior to passage of the resulting mixture to a succeeding zone, the overall molar ratio of the alkane to the nitrating agent supplied to the process being lower than 4 to 1 when using nitric acid as the nitrating agent, and 1 to 1 when using nitrogen dioxide as the nitrating agent.

2. The process as defined in claim 1, in which the alkane and nitrating agent vapors mixed in step (a) are admixed in the proportions of from 4 up to 10 mols of the alkane per mol of nitric acid when using nitric acid as the nitrating agent, and from 1 up to 5 mols of the alkane per mol of nitrogen dioxide when using nitrogen dioxide as the nitrating agent.

3. The process as defined in claim 1, in which cyclohexane is the alkane nitrated.

4. A continuous multi-stage process of mononitrating cyclohexane in the vapor phase, comprising:
   (a) mixing cyclohexane vapors and the vapors of a nitrating agent selected from the group consisting of nitric acid and nitrogen dioxide in the absence of liquid phase reactants, in the proportions of from 4 up to 10 mols of cyclohexane per mol of nitric acid when using nitric acid as the nitrating agent, and in the proportions of from 1 up to 5 mols of cyclohexane per mol of nitrogen dioxide, calculated as $NO_2$, when using nitrogen dioxide as the nitrating agent at a temperature below 250° C.;
   (b) passing the resultant vapor mixture into the first of a plurality of reaction zones, in each of which the temperature is maintained at from 250° to 375° C. and the residence time for the reactants and reaction product is from 20 to 150 seconds, the temperature and residence time being maintained within the respective ranges in each reaction zone in inverse relationship to each other;

(c) admixing the reaction products from each zone with additional vapors of the nitrating agent and passing the resultant mixture through each succeeding reaction zone, the over-all molar ratio of the cyclohexane to the nitrating agent supplied to the process being lower than 4 to 1 when using nitric acid as the nitrating agent, and 1 to 1 when using nitrogen dioxide as the nitrating agent; and (d) removing the reaction mixture from the last reaction zone and separating the mononitrated cyclohexane from this reaction mixture.

5. The process as defined in claim 4, in which from 0.8 to 1.2 mols of nitrating agent vapors are admixed with the reaction products from each zone per mol of nitrating agent introduced into said first zone, and from 0.5 to 1 mol of nitric oxide vapors is introduced into each of the reaction zones per mol of nitrating agent introduced into each said zone.

6. A continuous multi-stage process of mononitrating cyclohexane in the vapor phase, comprising:
 (a) mixing cyclohexane vapors and nitrogen dioxide vapors in the absence of liquid phase reactants at a temperature below that at which substantial nitration occurs, in the proportions of from 1 to 1.5 mols of cyclohexane per mol of nitrogen dioxide, calculated as $NO_2$;
 (b) passing the resultant vapor mixture into the first of a plurality of reaction zones, in each of which the temperature is maintained at from 250° to 375° C. and the residence time for the reactants and reaction products is from 20 to 150 seconds;
 (c) admixing the reaction products from each reaction zone with additional nitrogen dioxide vapors and passing the resultant mixture through each succeeding zone, the over-all molar ratio of cyclohexane to nitrogen dioxide supplied to the process being less than 1 to 1; and
 (d) removing the reaction mixture from the last reaction zone and separating the mononitrated cyclohexane from this reaction mixture.

7. The process as defined in claim 6, in which the reaction products from each reaction zone are admixed in step (c) with from 0.8 to 1.2 mols of nitrogen dioxide vapors and the residence time for the reactants and reaction products in each of the reaction zones is from 20 to 70 seconds.

8. A continuous multi-stage process for mononitrating cyclohexane in the vapor phase, comprising:
 (a) mixing cyclohexane vapors and nitric acid vapors in the absence of liquid phase reactants at a temperature below that at which substantial nitration occurs, in the proportions of from 4 to 5 mols of cyclohexane per mol of nitric acid;
 (b) passing the resultant vapor mixture into the first of a plurality of reaction zones, in each of which the temperature is maintained at from 250° to 375° C. and the residence time for the reactants and reaction products is from 20 to 150 seconds;
 (c) admixing the reaction products from each reaction zone with additional nitric acid vapors and passing the resultant mixture through each succeeding zone, the over-all molar ratio of cyclohexane to nitric acid supplied to the process being less than 4 to 1; and
 (d) removing the reaction mixture from the last reaction zone and separating the mononitrated cyclohexane from this reaction mixture.

9. The process as defined in claim 8, in which the reaction products from each reaction zone are admixed in step (c) with from 0.8 to 1.2 mols of nitric acid vapors and the residence time for the reactants and reaction products in each of the reaction zones is from 20 to 70 seconds.

10. A continuous process for mononitrating cyclohexane in the vapor phase, comprising:
 (a) mixing vapors of cyclohexane, nitric oxide and nitrogen dioxide in the absence of liquid phase reactants at a temperature below that at which substantial nitration occurs and in the proportions of from 1 to 1.5 mols of cyclohexane and 0.5 to 1 mol of nitric oxide per mol of nitrogen dioxide, calculated as $NO_2$;
 (b) passing the resultant gaseous mixture into the first of a plurality of reaction zones, in each of which the temperature is maintained within the range of from 250° to 375° C. and the residence time for the reactants and reaction products is from 40 to 50 seconds;
 (c) adding about 1 mol of nitrogen dioxide vapors and 0.5 to 1 mol of nitric oxide vapors per mol of nitrogen dioxide introduced in step (a) to the reaction mixture withdrawn from each reaction zone and passing the resultant mixture through each succeeding reaction zone, the over-all molar ratio of cyclohexane to nitrogen dioxide being less than 1 to 1; and
 (d) removing the reaction mixture from the last reaction zone and separating the mononitrated cyclohexane therefrom.

References Cited in the file of this patent

UNITED STATES PATENTS

| | | |
|---|---|---|
| 2,071,122 | Hass et al. | Feb. 16, 1937 |
| 2,512,587 | Stengel | June 20, 1950 |
| 2,894,041 | Berg | July 7, 1959 |